April 19, 1949.    J. HALLER    2,467,740
STEP-BY-STEP FEEDING DEVICE
Filed March 15, 1947    2 Sheets-Sheet 1
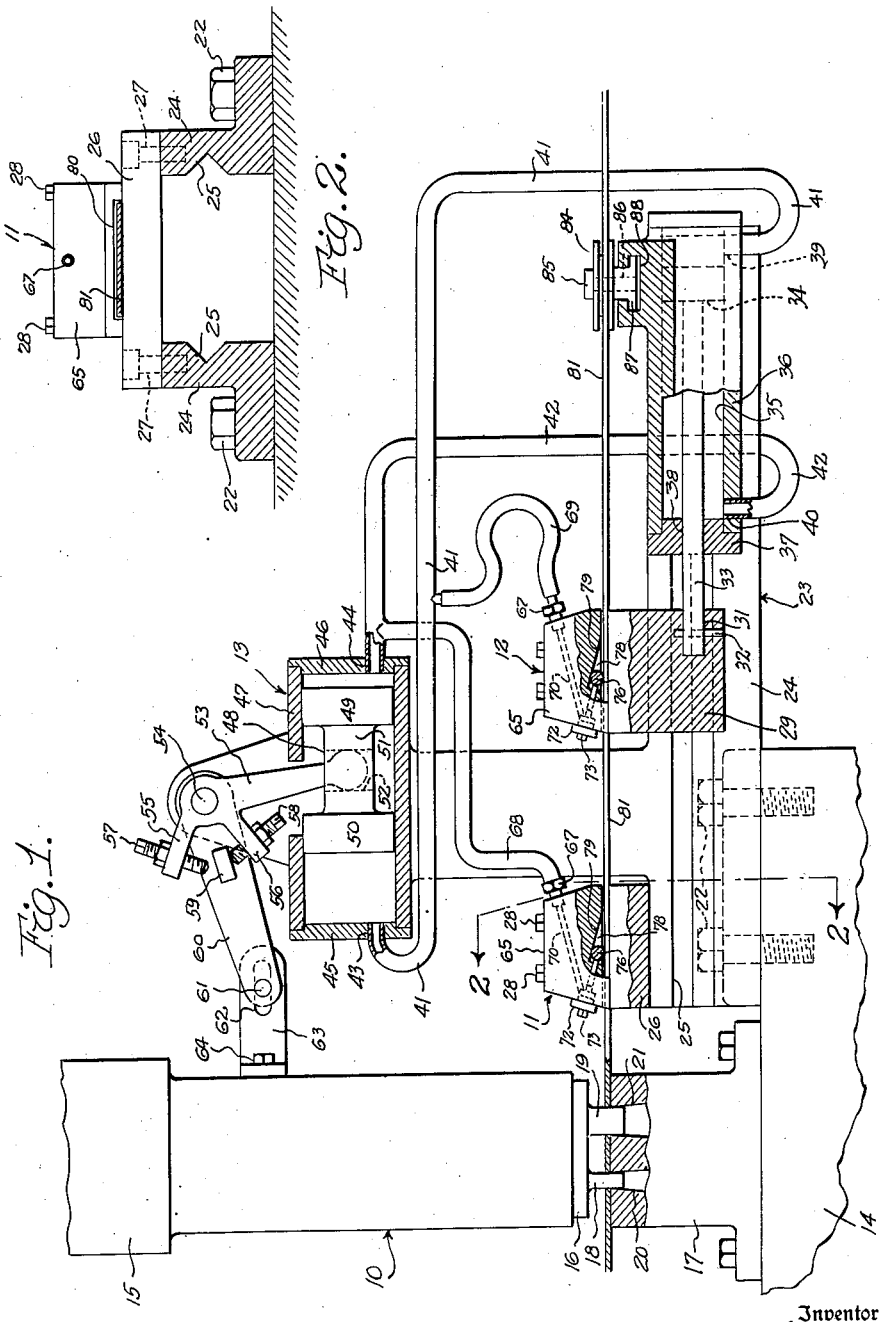
Inventor
John Haller
Barthel + Bugbee
Attorneys

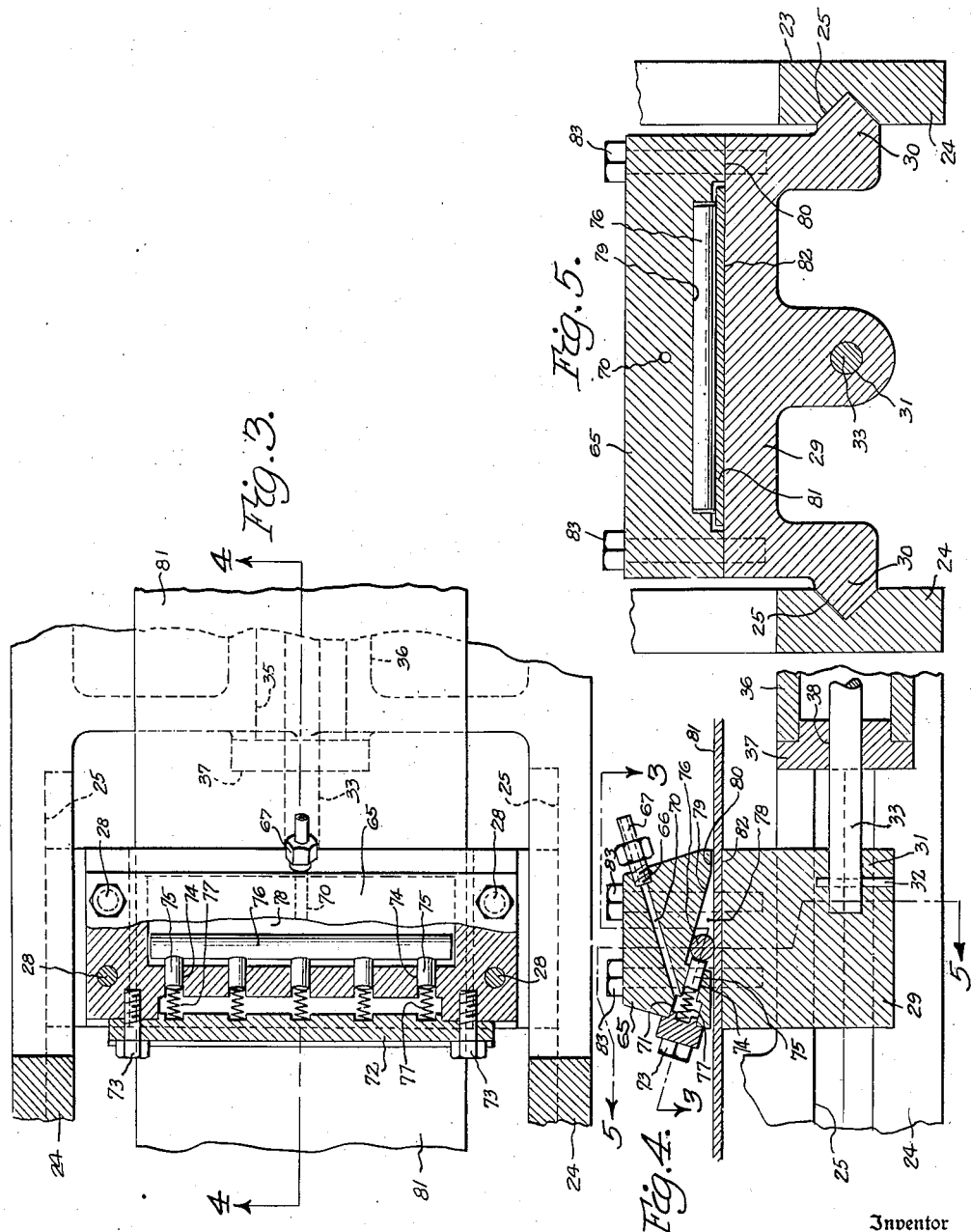

Patented Apr. 19, 1949

2,467,740

UNITED STATES PATENT OFFICE 2,467,740

STEP-BY-STEP FEEDING DEVICE

John Haller, Northville, Mich.

Application March 15, 1947, Serial No. 734,904

6 Claims. (Cl. 271—2.5)

This invention relates to feeding mechanisms and in particular to automatic feed mechanisms for feeding strips or sheets of stock between the die members of cutting, punching or stamping machines.

One object of this invention is to provide an intermittent feed mechanism for feeding sheet stock between the die members of a stamping, cutting or punching machine so that the sheet stock is clamped hydraulically to the feeding slide and unclamped automatically upon the return stroke of the feeding slide.

Another object is to provide an intermittent feed mechanism as set forth in the preceding object, wherein a pair of hydraulically-operated clamping devices is provided, one being mounted to press the stock against the machine bed and the other being mounted to press the stock against the feeding slide, means being provided to actuate the slide-mounted clamping device on the feeding stroke and the bed-mounted feeding device on the return stroke of the slide, so that the work is advanced intermittently.

Another object is to provide an intermittent feed mechanism as set forth in the preceding objects, wherein the motion of the ram or platen of the machine controls the supplying of pressure fluid to the bed-mounted clamping device on the working stroke of the platen so that the feeding slide is retracted without moving the work, the motion of the platen also supplying pressure fluid to the bed-mounted clamping device on the retraction stroke of the platen so as to clamp the sheet to the feeding slide and advance the work sheet in preparation for another working stroke of the platen, the pressure fluid being supplied alternately to the two clamping devices.

Another object is to provide an intermittent feed mechanism as set forth in the preceding objects, wherein the motion of the platen of the machine actuates a pump which alternately supplies pressure fluid to one of the clamping devices while placing the other clamping device under suction to withdraw fluid therefrom.

Another object is to provide a clamping device for clamping sheet material to a support, the device being hydraulically actuated to press a clamping member into engagement with the sheet material so as to hold it firmly against the support so long as the device is supplied with pressure fluid.

Another object is to provide a clamping device as set forth in the object immediately preceding, wherein a clamping roller working in a tapered recess is pushed into engagement with the sheet material by means of hydraulic pressure.

In the drawings:

Figure 1 is a diagrammatic side elevation, partly in section, of a portion of a cutting, punching or stamping machine having a hydraulic feed and hydraulic clamping arrangement according to a preferred form of the invention;

Figure 2 is a fragmentary vertical section through the bed of the machine immediately adjacent one of the clamping devices, taken along the line 2—2 in Figure 1;

Figure 3 is an enlarged top plan view partly in section through the slide-mounted clamping device taken along the zigzag line 3—3 in Figure 4;

Figure 4 is a vertical section through the slide-mounted clamping device taken along the line 4—4 in Figure 3; and Figure 5 is a vertical section through the slide-mounted clamping device and the slide thereof taken along the line 5—5 in Figure 4.

Referring to the drawings in detail, Figure 1 shows a cutting, punching or stamping machine generally designated 10 with which are associated bed-mounted and slide-mounted clamping devices generally designated 11 and 12 supplied alternately with pressure fluid from a platen-operated hydraulic pump, generally designated 13. Figure 1 shows a purely diagrammatic arrangement of the mechanisms associated with the clamping devices 11 and 12, certain details of construction being omitted in order to simplify the showing. While the pump 13 has been shown as separate and distinct from the feeding motor which it operates (Figure 1) it will be understood that in practice these may be more intimately interconnected or interrelated such as is disclosed in my co-pending application Serial No. 576,821 filed February 8, 1945, for Stock feeding mechanism for punching, stamping and cutting machines, which is now Patent No. 2,428,493.

The machine 10 may consist, for example, of a punch press having a bed 14 and a vertically reciprocable platen or ram 15, the machine 10 being conventional and its details forming no part of the present invention. Secured to the bed 14 and platen 15 are cooperating male and female die members 16 and 17 respectively having projections 18 and 19 received in recesses 20 and 21 respectively (Figure 1). Also mounted on the bed 14 as by the bolts 22 is a sheet or strip feeding mechanism generally designated 23. The feeding mechanism 23 consists of a pair of parallel guide members 24 of L-shaped cross-section (Figure 2) having opposed guide grooves 25 of V-shaped cross-section and interconnected by a bridge member 26 bolted thereto as at 27. The bed-mounted or stationary clamping device 11 is bolted as at 28 to the bridge member 26.

Mounted for reciprocating movement in the guide grooves 25 is a slide 29 having oppositely-extending ribs or flanges 30 of V-shaped cross-section (Figure 5) mating with the grooves 25. The slide 29 is provided with a socket 31 in which is secured, as by the pin 32, the forward end of a plunger 33 which at its opposite end is provided with a head 34. The head 34 reciprocates in the bore 35 of a hydraulic cylinder 36. The latter is provided with a closure 37 having a bore 38 through which the plunger 33 passes. The usual packing gland (not shown) is provided to prevent leakage around the plunger 33. The cylinder 36 is provided at its opposite ends with ports 39 and 40 to which are connected pipes 41 and 42 leading to ports 43 and 44 (Figure 1) in the opposite end plates 45 and 46 of a hydraulic cylinder 47.

The cylinder 47 contains a doubleheaded piston 48 having heads 49 and 50 interconnected by a neck 51 having a transverse bore 52. The bore 52 receives the rounded end of a crank 53 mounted on a shaft 54 and having arms 55 and 56 through which are threaded limit screws 57 and 58, the ends of which engage a projection 59 extending laterally from an arm 60 loosely mounted on the shaft 54. The outer end of the arm 60 carries a pin 61 engaging a slot 62 in a bracket 63 bolted as at 64 to the platen 15. Consequently, when the platen 15 reciprocates, it swings the arm 60 through the pin and slot connection 61, 62, causing the crank 53 to swing through a length of stroke determined by the adjustment of the limit screws 57, 58, and consequently reciprocating the piston 48.

The clamping devices 11 and 12 are of similar construction, hence one description will suffice for both. Each is provided with a block-like casing 65 (Figures 4 and 5) having a port 66 into which is threaded a connection 67. The connection 67 of the stationary clamping device 11 is connected by a branch pipe 68 to the pipe 42 whereas that of the movable clamping device 12 is connected by a flexible branch pipe 69 to the pipe 41.

The port 66 opens into a downwardly-inclined passageway 70 (Figure 4) leading to a laterally elongated chamber 71 closed by an elongated plate 72 bolted as at 73 to the casing 65. Leading downwardly from the chamber 71 are multiple bores 74 which receive pins 75 forming plungers. The pins 75 are urged into engagement with a laterally elongated roller 76 (Figure 3) by means of coil springs 77. The roller 76 is mounted in a recess 78 with a tapered wall 79 inclined downward relatively to the bottom wall 80 of the casing 65. The latter rests upon the sheet or strip 81 forming the workpiece and this in turn rests upon the upper surface 82 of the slide 29 (Figure 5). Bolts 83 pass downward through the casing 65 of the movable clamping device 12 in order to secure it to the slide 29.

The workpiece 81 is guided at its edges by grooved guide wheels 84 (one only being shown) which are rotatably mounted upon vertical axles 85 (Figure 1) seated in bores 86 in slide blocks 87 of T-shaped cross-section. These are mounted in a T-slot 88 by which they may be moved to and fro laterally to adjust them to different widths of workpiece 81.

In the operation of the invention, a workpiece 81, such as a strip of material, for example sheet steel, is inserted between the guide wheels 84 and passed through the chambers 78 of the clamping devices 11 and 12 and into the space between the punch 16 and die 17 (Figure 1). When the platen 15 is moved downward it swings the arm 60 downward and this in turn swings the crank 53 to the right, moving the double-headed piston 48 to the right. This causes pressure fluid to be transmitted through the pipe 42 and port 40 into the left-hand end of the cylinder 36, causing the head 34 on the plunger 33 to be moved to the right, carrying with it the slide 29 and movable clamping device 12. At the same time, pressure fluid passes through the branch pipe 68 and passageway 70 of the stationary clamping device 11 into the chamber 71. This pressure fluid urges the piston-like pins 75 downward to the right (Figure 1) forcing the roller 76 against the inclined wall 79 of the recess 78, so that it tightly engages the workpiece 81 by a wedging action and forces it against the bridge member 26. This holds the workpiece firmly in a stationary position while the punch 16 and die 17 perform their work.

Meanwhile, the travel of the piston 48 to the right creates a suction in the left-hand end of the cylinder 47 (Figure 1), causing a corresponding suction to be created in the right-hand end of the cylinder 36, withdrawing fluid therefrom through the pipe 41. The same suction also withdraws fluid from the chamber 71 of the movable clamping device 12 by way of the flexible pipe 69, releasing the grip of the piston pins 75 upon the roller 76 (Figure 3) and terminating its wedging action against the workpiece 81. As a consequence, the slide 29 and movable clamping device 12 are free to slide as a unit to the right on a retraction stroke, preparatory to starting a new feeding stroke.

After the punch 16 and die 17 have performed their work and the platen 15 moves upward, the upward swinging of the arm 60 moves the crank 53 to the left and with it the doubleheaded piston 48. This causes pressure fluid to be pumped from the left-hand end of the cylinder 47 through the pipes 41 and 69 into the right-hand end of the feeding cylinder 36 and also into the chamber 71 of the movable clamping device 12. This action causes the head 34, plunger 33 and slide 29 to move to the left, shifting the workpiece 81 another step beneath the punch 16 while at the same time the piston pins 75 jam the roller 76 of the movable clamping device 12 tightly into engagement with the workpiece 81 and holding it securely against the slide 29. The workpiece 81, being thus tightly clamped to the slide 29, is fed along with it as the slide 29 reciprocates to the left.

While this is going on, the suction developed in the right-hand end of the cylinder 47 by the travel of the double-headed piston 48 to the left, creates a suction in the left-hand end of the feeding cylinder 36, withdrawing fluid therefrom through the pipe 42, and at the same time withdrawing fluid from the chamber 71 of the stationary clamping device 11. This action releases the grip of the piston pins 75 upon the roller 76 of the clamping device 11, causing it to release its grip upon the workpiece 81 so that the latter slides freely over the bridge member 26 as the workpiece 81 is advanced by the clamping action of the clamping device 12.

In this manner, the workpiece 81 is advanced step by step in synchronism with the motion of the platen 15, causing the workpiece 81 to be punched successively by the punch 16 and die 17. The clamping devices 11 and 12 are always in synchronism, since they are alternately subjected to the same pressure and suction of the fluid used to operate the plunger 33 in the feeding cylinder 36.

The feeding cylinder 36, for purposes of simplicity, is shown as having a fixed stroke. It may, however, be provided with an adjustable stroke by adopting the construction shown in my above-mentioned co-pending application Serial No. 576,821, filed February 8, 1945, which is now Patent No. 2,428,493.

What I claim is:

1. A step-by-step feeding device for feeding sheet material to a machine having a movable material-processing member, said device comprising a stationary material support, a movable material support, an instrumentality for moving said movable support toward and away from said stationary support, a pressure-fluid-actuated clamp mounted adjacent each support, each clamp having a clamping member movable into clamping engagement with said material against its respective support, a pressure fluid pump connected oppositely to said clamps, and mechanism operatively connected to and interconnecting said pump and said movable machine member and responsive to the motion of said movable machine member for actuating said pump to supply pressure fluid alternately to said clamps.

2. A step-by-step feeding device for feeding sheet material to a machine having a movable material-processing member, said device comprising a stationary material support, a movable material support, an instrumentality for moving said movable support toward and away from said stationary support, a pressure-fluid-actuated clamp mounted adjacent each support, each clamp having a clamping member movable into clamping engagement with said material against its respective support, a pressure fluid pump having a pressure port and a suction port alternately connectable to said clamps, and mechanism responsive to the motion of said movable machine member for actuating said pump to alternately supply pressure fluid to one clamp while applying suction to the other clamp.

3. A step-by-step feeding device for feeding sheet material to a machine having a movable material-processing member, said device comprising a stationary material support, a movable material support, an instrumentality for moving said movable support toward and away from said stationary support, a pressure-fluid-actuated clamp mounted adjacent each support, each clamp having a clamping member movable into clamping engagement with said material against its respective support, a double-acting pressure fluid pump having a pair of oppositely-disposed, alternately-acting pressure and suction ports, one of said ports being connected to one clamp and the other port being connected to the other clamp, and mechanism responsive to the motion of said movable machine member for actuating said pump to alternately supply pressure fluid to one clamp while applying suction to the other clamp.

4. A step-by-step feeding device for feeding sheet material to a machine having a movable material-processing member, said device comprising a stationary material support, a movable material support, an instrumentality for moving said movable support toward and away from said stationary support, a pressure-fluid-actuated clamp mounted adjacent each support, each clamp having a clamping member movable into clamping engagement with said material against its respective support, a double-acting pressure fluid pump having a pair of oppositely-disposed, alternately-acting pressure and suction ports, one of said ports being connected to one clamp and the other port being connected to the other clamp, and mechanism responsive to the motion of said movable machine member for actuating said pump to alternately supply pressure fluid to one clamp while applying suction to the other clamp, said instrumentality including a pressure fluid motor attached to said movable support and connected to said pump for actuation by said pump in response to the motion of said movable machine member.

5. A step-by-step feeding device for feeding sheet material to a machine having a movable material-processing member, said device comprising a stationary material support, a movable material support, an instrumentality for moving said movable support toward and away from said stationary support, a pressure-fluid-actuated clamp mounted adjacent each support, each clamp having a clamping member movable into clamping engagement with said material against its respective support, a double-acting pressure fluid pump having a pair of oppositely-disposed, alternately-acting pressure and suction ports, one of said ports being connected to one clamp and the other port being connected to the other clamp, and mechanism responsive to the motion of said movable machine member for actuating said pump to alternately supply pressure fluid to one clamp while applying suction to the other clamp, said instrumentality including a double-acting pressure fluid motor attached to said movable support and having alternately-acting pressure and suction ports connected to the oppositely disposed ports of said pump.

6. A step-by-step feeding device for feeding sheet material to a machine having a movable material-processing member, said device comprising a stationary material support, a reciprocable material support, an instrumentality for reciprocating said movable support toward and away from said stationary support, a pressure-fluid-actuated clamp mounted adjacent each support, one of said clamps being reciprocable with said reciprocable support, each clamp having a clamping plunger movable into clamping engagement with said material against its respective support, a pressure-fluid pump connected to said clamps, and mechanism operatively connected to and interconnecting said pump and said movable machine member and responsive to the motion of said machine member for actuating said pump to distribute pressure fluid alternately to said clamps.

JOHN HALLER.

REFERENCES CITED

The following references are of record in the file of this patent:

UNITED STATES PATENTS

| Number | Name | Date |
| --- | --- | --- |
| 1,826,498 | Bignell | Oct. 6, 1931 |
| 1,851,678 | Mayer | Mar. 29, 1932 |
| 1,964,988 | Hill | July 3, 1934 |
| 2,096,073 | Spencer | Oct. 19, 1937 |
| 2,102,721 | Kivley | Dec. 21, 1937 |
| 2,400,514 | Kantner, Jr. | May 21, 1946 |